US012447762B2

(12) United States Patent
Shirokoshi

(10) Patent No.: US 12,447,762 B2
(45) Date of Patent: Oct. 21, 2025

(54) RECORDING DEVICE

(71) Applicant: SEIKO EPSON CORPORATION, Tokyo (JP)

(72) Inventor: Junji Shirokoshi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 177 days.

(21) Appl. No.: 18/145,049

(22) Filed: Dec. 22, 2022

(65) Prior Publication Data

US 2023/0202219 A1 Jun. 29, 2023

(30) Foreign Application Priority Data

Dec. 23, 2021 (JP) ................................ 2021-209014

(51) Int. Cl.
*B41J 29/02* (2006.01)
*B41J 2/14* (2006.01)
*B41J 2/165* (2006.01)

(52) U.S. Cl.
CPC ................ *B41J 29/02* (2013.01); *B41J 2/14* (2013.01); *B41J 2/165* (2013.01); *B41J 2002/14491* (2013.01)

(58) Field of Classification Search
CPC ............................................ B41J 2002/14491
See application file for complete search history.

(56) References Cited

U.S. PATENT DOCUMENTS

2004/0056926 A1* 3/2004 Samoto .................... B41J 29/02 347/50
2016/0274529 A1 9/2016 Yoshikawa et al.
2017/0182814 A1* 6/2017 Murakami ................ B41J 3/36
2018/0281391 A1* 10/2018 Fukasawa ........... B41J 2/14201

FOREIGN PATENT DOCUMENTS

JP 2012171332 9/2012

OTHER PUBLICATIONS

Office Action for JP Patent Application No. 2021209014, issued on Jun. 17, 2025, 8 pages.

* cited by examiner

*Primary Examiner* — Shelby L Fidler
(74) *Attorney, Agent, or Firm* — CHIP LAW GROUP

(57) ABSTRACT

A recording device includes: a line head movable to a recording position to perform recording on a medium and to a retracted position where the recording unit is retracted in a first direction from the recording position; a first control board; a cable configured to electrically couple the line head to the first control board; a side frame provided between the line head and the first control board; and a hole through which the cable passes, the hole being provided in the side frame, wherein a diameter of the hole in the first direction is longer than a distance between a position of a passing portion corresponding to the recording position and a position of the passing portion corresponding to the retracted position, the passing portion being a portion of the cable passing through the hole.

16 Claims, 6 Drawing Sheets

RECORDING DEVICE

The present application is based on, and claims priority from JP Application Serial Number 2021-209014, filed Dec. 23, 2021, the disclosure of which is hereby incorporated by reference herein in its entirety.

BACKGROUND

1. Technical Field

The present disclosure relates to a recording device.

2. Related Art

There has been known a recording device including a cable that electrically couples a recording unit such as a recording head to a control unit. For example, JP-A-2016-175282 discloses a recording device in which a flat cable that couples a recording unit to a control unit is provided with a relay unit. The relay unit is provided in a frame.

Unfortunately, with the recording device described in JP-A-2016-175282, there has been a problem in that the cost reduction is difficult because the provision of the relay unit leads to a higher part cost and the like.

In view of this, the relay unit is omitted in some cases with the frame provided with a through hole through which the cable passes. However, with a configuration in which the recording head is movable, there has been a problem in that the cable is likely to be damaged, due to contact between the cable and an edge of the through hole. Specifically, when the recording head is a line head, a configuration may be employed in which the line head moves between a recording position where recording on a medium is performed and a retracted position where cleaning or the like is performed. Since the line head moves, the cable and the edge of the through hole are likely to come into contact with each other. Thus, the contact may be repeated, leading to the damage on the cable deepening, and this may result in compromised characteristics of the cable or the like. All things considered, there has been a demand for a recording device that can suppress damage on a cable coupling a recording unit to a control unit, while achieving cost reduction.

SUMMARY

A recording device includes a recording unit configured to move to a recording position to perform recording on a medium and to a retracted position where the recording unit is retracted in a first direction from the recording position, a first control board coupled to the recording unit, a cable configured to electrically couple the recording unit to the first control board, a frame provided between the recording unit and the first control board, and a hole that is provided in the frame and through which the cable passes, wherein a diameter of the hole in the first direction is longer than a distance between a position of a passing portion corresponding to the recording position and a position of the passing portion corresponding to the retracted position, the passing portion being a portion of the cable passing through the hole.

A recording device includes a recording unit configured to move to a recording position to perform recording on a medium and to a retracted position where the recording unit is retracted in a first direction from the recording position, a first control board coupled to the recording unit, a cable configured to electrically couple the recording unit to the first control board, a frame provided between the recording unit and the first control board, and a hole that is provided in the frame and through which the cable passes, a first regulating portion configured to regulate movement of the cable, and a holding member configured to move in conjunction with movement of the recording unit, wherein the recording unit is provided on one side of the frame and the first control board is provided on another side of the frame, and the first regulating portion is fixed to the holding member on the one side.

DESCRIPTION OF EXEMPLARY EMBODIMENTS

Figure 1:
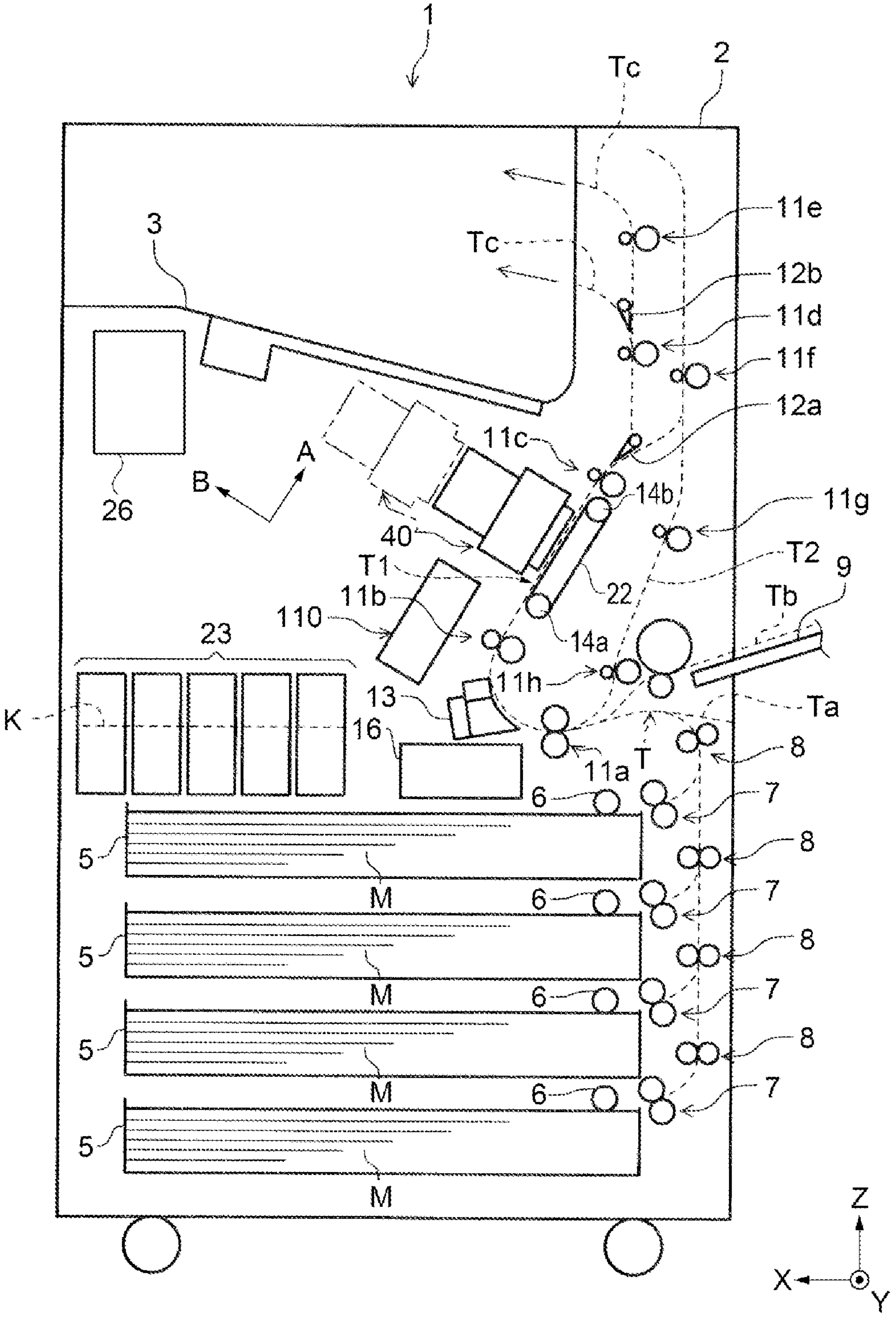
FIG. 1 is a schematic view illustrating a schematic configuration of a recording device according to an embodiment.

In an embodiment described below, an inkjet printer is described as an example of a recording device, with reference to the drawings. For convenience of illustration, the size of each member is different from the actual size.

In each of the drawings, XYZ axes as well as AB axes are provided, as necessary, as coordinate axes orthogonal to each other, and a direction indicated by each arrow is referred to as a + direction, and a direction opposite to the + direction is referred to as a − direction. When the recording device is installed on a horizontal plane, the Z axis extends along a vertical direction, and an XY plane extends along the horizontal plane. The −X direction of directions along the X axis may be referred to as a back side. The +Z direction and −Z direction of directions along the Z axis may be referred to as an upper side and a lower side, respectively. In the drawings given below, parts other than main parts are omitted.

As illustrated in FIG. 1, a recording device 1 according to this embodiment includes a housing 2 having a substantially rectangular parallelepiped shape that is long in a direction along the Z axis. The recording device 1 includes, in the housing 2, a plurality of medium cassettes 5, a conveyance route T, a line head 40 serving as a recording unit, a first control board 26 serving as a control unit, and a discharge portion 3 on the upper side of the housing 2. Although not illustrated in the drawings, the recording device 1 further includes a cable that electrically couples the line head 40 to the first control board 26.

Regarding the conveyance route T on which a medium M is conveyed from the medium cassette 5 to the discharge portion 3 through a region facing the line head 40, the side of the medium cassette 5 may be referred to as upstream and the side of the discharge portion 3 may be referred to as downstream.

The first control board 26 includes a central processing unit (CPU), a system bus, a read only memory (ROM), a random access memory (RAM), and the like. The first control board 26 is electrically coupled to each of the components of the recording device 1 including the line head 40 and performs overall control on the operation of the recording device 1. The recording device 1 may be operated from an information device such as a personal computer via the first control board 26. In FIG. 1, the first control board 26 is positioned above an ink tank 23, but the arrangement of the first control board 26 is not limited to the one described above.

The plurality of medium cassettes 5 are disposed while overlapping in the direction along the Z axis, on the lower side in the housing 2. The plurality of medium cassettes 5 each accommodate the medium M. Although not illustrated in the drawings, the medium cassette 5 can be pulled out from the housing 2. Then, the medium cassette 5 is replenished with the medium M.

The medium M is a single sheet recording medium such as paper. The recording device 1 performs recording on the medium M. The medium M is conveyed from the medium cassette 5 toward the region facing the line head 40 by a pick roller 6 and conveyance roller pairs 7 and 8, along the conveyance route T.

The recording device 1 includes conveyance paths Ta, Tb, and Tc. The medium M can be taken into the conveyance route T from the outside of the housing 2 through the conveyance paths Ta and Tb. On the conveyance path Ta, the medium M is conveyed to the conveyance route T from an external device, not illustrated, coupled to the back side of the housing 2. On the conveyance path Tb, the medium M is conveyed to the conveyance route T from a manual feed tray 9. On the conveyance path Tc, the medium M on which the recording has been performed is discharged to the discharge portion 3.

On the conveyance route T, the medium M is conveyed. The conveyance route T includes a first conveyance route T1 and a second conveyance route T2. The first conveyance route T1 is a route on which the line head 40 performs the recording on the medium M, including a region where the line head 40 and the medium M face each other. The second conveyance route T2 is a reversing route for a case where the recording is performed on both sides of the medium M. The medium M is first conveyed toward the first conveyance route T1.

The first conveyance route T1 is a conveyance route T between a conveyance roller pair 11*b* and a conveyance roller pair 11*c* described below. The second conveyance route T2 is disposed more on the back side than the first conveyance route T1, and extends substantially toward the upper side from a conveyance roller pair 11*a* described below.

The conveyance route T is provided with conveyance roller pairs 11*a*, 11*b*, 11*c*, 11*d*, 11*e*, 11*f*, 11*g*, and 11*h*, flaps 12*a* and 12*b*, and a medium width sensor 13.

The conveyance roller pairs 11*a* and 11*b* are disposed on the upstream of the first conveyance route T1. The conveyance roller pair 11*c* is disposed on the immediately downstream of the region where the medium M and the line head 40 face each other, in the first conveyance route T1. The conveyance roller pairs 11*d* and 11*e* are disposed in the conveyance path Tc. On the second conveyance route T2, the conveyance roller pair 11*g* and the conveyance roller pair 11*h* are disposed in this order from the upper side toward the lower side. The conveyance roller pair 11*f* is disposed in the conveyance route T extending on the upper side of the second conveyance route T2. The medium M before the recording passes through the conveyance roller pairs 11*a* and 11*b* to reach the first conveyance route T1.

The medium width sensor 13 detects a width of the medium M that is a length in a direction along the Y axis. The medium width sensor 13 is disposed in the conveyance route T between the conveyance roller pairs 11*a* and 11*b*.

In the first conveyance route T1, conveyor belt driving rollers 14*a* and 14*b*, a conveyor belt 22, and an adsorption mechanism not illustrated.

The conveyor belt 22 is a main member forming the first conveyance route T1. The conveyor belt 22 is wound across the conveyor belt driving rollers 14*a* and 14*b*. For example, one of the conveyor belt driving rollers 14*a* and 14*b* is a driving motor and the other one is a driven roller. The driving motor rotates clockwise in FIG. 1 to drivingly rotate the conveyor belt 22. With this configuration, the conveyor belt 22 conveys the medium M not illustrated adsorbed by the adsorption mechanism described below.

The adsorption mechanism is disposed near the conveyor belt driving roller 14*a*. The adsorption mechanism makes the medium M adsorbed on the conveyor belt 22. The adsorption mechanism is a charging device for example, and charges the conveyor belt 22. The medium M is adsorbed on a surface of the conveyor belt 22 facing the first conveyance route T1 by static electricity. Thus, the medium M is less likely to be displaced in the first conveyance route T1. The adsorption mechanism is not limited to a charging device, and may be configured to make the medium M adsorbed using suction force produced by a suction pump or the like for example.

The line head 40 is disposed to face the first conveyance route T1. The line head 40 performs recording on the medium M conveyed along the first conveyance route T1. The line head 40 is movable to a recording position at which the recording is performed on the medium M and to a retracted position at which the maintenance or the like is performed on the line head 40. In FIG. 1, the line head 40 at the recording position is illustrated by a solid line, and the line head 40 at the retracted position is illustrated by a two-dot chain line.

The retracted position is a position in a +B direction that is a first direction relative to the recording position. In other words, a position retracted from the recording position along the +B direction is the retracted position. A direction on which the medium M is conveyed along the first conveyance route T1 is a +A direction. The +A direction and the +B direction are orthogonal to each other. The +A direction and the +B direction cross the vertical direction.

Although not illustrated in the drawings, the line head 40 has a surface, facing the first conveyance route T1, provided with a plurality of nozzles. The plurality of nozzles form nozzle arrays corresponding to the number of a plurality of ink tanks 23. Each of the ink tanks 23 stores ink K. The ink K is liquid ink with colors such as black, cyan, magenta, and yellow. The plurality of ink tanks 23 may store the ink K of different colors or may store the ink K of the same color.

Each of the ink tanks 23 is coupled to the line head 40 through an ink pipe not illustrated. From each of the ink tanks 23, each ink K is supplied to the line head 40 through the ink pipe. Each ink K is ejected, as droplets, onto the medium M from the corresponding nozzle of the line head 40. The droplets of the ink K are attached to the medium M, being conveyed in the +A direction, at a predetermined timing, whereby an image, a text, or the like is recorded on the medium M.

The line head 40 includes a piezoelectric element serving as an actuator that is a driving unit. For example, for the driving unit, an electromechanical transducer that displaces a diaphragm serving as the actuator by means of electrostatic adsorption, or an electrothermal transducer that makes the ink K ejected as droplets by means of bubbles produced by heating may be used.

A cap unit 110 is disposed in a −A direction of the line head 40. When the line head 40 is at the retracted position, the cap unit 110 moves in the +A direction to come into close contact with a surface of the line head 40 where the plurality of nozzles are disposed. In this state, the cap unit 110 is sucked by a suction pump not illustrated. Thus, the ink K is sucked out from the plurality of nozzles.

In this manner, maintenance such as cleaning is performed on the plurality of nozzles. The ink K sucked by the cap unit 110 is stored in a waste tank 16 below the line head 40. Although not illustrated in the drawings, a wiper unit is provided that wipes the ink K attached to the nozzle surface of the line head 40 where the plurality of nozzles are disposed.

The flaps 12*a* and 12*b* switch the route along which the medium M is conveyed. The flap 12*a* is disposed on the immediately downstream of the conveyance roller pair 11*c*. The flap 12*a* switches the conveyance route T on the downstream of the first conveyance route T1 to the conveyance path Tc or the second conveyance route T2. The flap 12*b* is disposed in the conveyance path Tc, and branches the conveyance path Tc into two routes.

When the recording is performed by the line head 40, the medium M is conveyed toward the downstream through the conveyance roller pair 11*c*. When the recording is performed only on one side of the medium M, the flap 12*a* is activated to guide the medium M to the conveyance path Tc. After the route has been branched by the flap 12*b*, the medium M conveyed to the conveyance path Tc is discharged to the discharge portion 3 as the recorded medium M.

When the recording is performed on both sides of the medium M, the flap 12*a* is activated to guide the medium M to the second conveyance route T2. The medium M is first conveyed to a portion near the upper side of the housing 2 by the conveyance roller pair 11*f* and the like, in the second conveyance route T2 and the conveyance route T on the upper side of the second conveyance route T2. Then, the medium M is conveyed along the second conveyance route T2 toward the lower side and through the conveyance roller pairs 11*g* and 11*h*, to join the conveyance route T on the upstream of the conveyance roller pair 11*a*. The medium M again passes through the conveyance roller pairs 11*a* and 11*b*, to be conveyed to the first conveyance route T1.

By passing through the route described above, the medium M is reversed upside down, to have the surface of the medium M on which the recording has not been performed faces the line head 40. After the recording is performed by the line head 40, the medium M is discharged to the discharge portion 3 in the same manner as the recording performed only on one side.

The first conveyance route T1 and the second conveyance route T2 extend in the −Z direction, which is the vertical direction, and in a direction crossing the direction orthogonal to the Z axis, that is, the horizontal direction. With this configuration, the recording device 1 has a small dimension in the vertical direction, that is, height, compared with the first conveyance route T1 and the second conveyance route T2 extending in the vertical direction. Furthermore, the recording device 1 has a small dimension in the horizontal direction, that is, width, compared with the first conveyance route T1 and the second conveyance route T2 extending in the horizontal direction. The arrangement of the first conveyance route T1 and the second conveyance route T2 is not limited to the above, and the routes may extend along the horizontal direction or the vertical direction.

Figure 2:
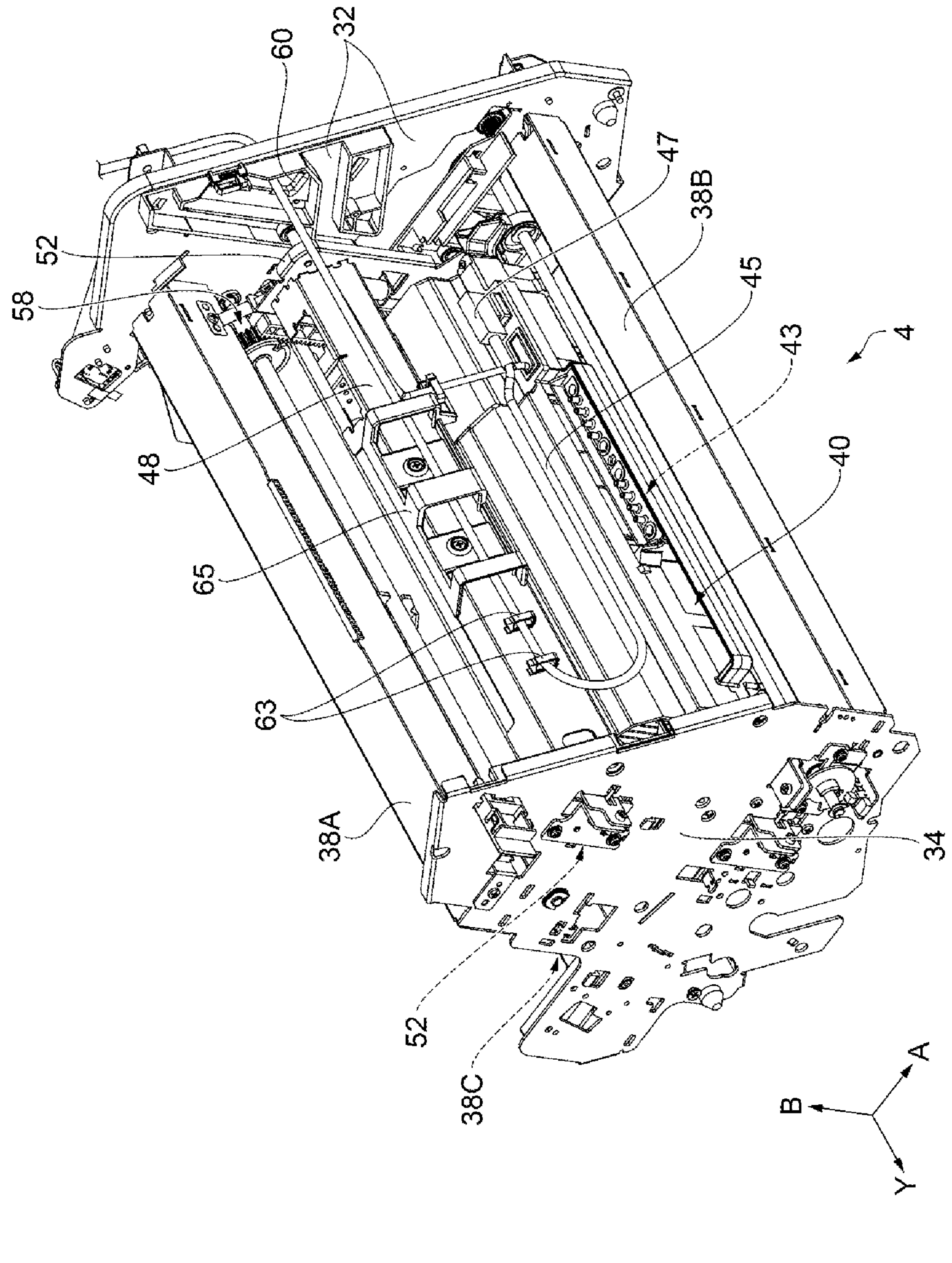
FIG. 2 is a perspective view illustrating a configuration of a head unit, a side frame, and the like in a housing.

As illustrated in FIG. 2, the recording device 1 includes side frames 32 and 34, and lateral frames 38A, 38B, and 38C inside the housing 2 not illustrated. The side frames 32 and 34 are substantially flat-plate shaped members, for example, and are obtained by processing materials such as iron and resin. The lateral frames 38A, 38B, and 38C are substantially prismatic shaped members, and are molded from a plate material such as iron.

The side frame 32 and the side frame 34 are disposed to have main surfaces facing the AB plane and to face each other in a direction along the Y axis with a gap in between. In the housing 2, the side frame 32 is disposed in the −Y direction and the side frame 34 is disposed in the +Y direction. The side frame 32 is an example of the frame of the present disclosure.

The side frame 32 is provided with a hole 60. The hole 60 is a through hole that is formed through the side frame 32 in the direction along the Y axis. The hole 60 is long in the direction along the B axis, in side view from the −Y direction. A cable 45 passes through the hole 60.

The lateral frames 38A, 38B, and 38C extend between the side frames 32 and 34 opposite to each other, and each have both end portions in the directions along the Y axis fixed to the side frames 32 and 34. The lateral frames 38A, 38B, and 38C have a substantially prismatic shape and are disposed with each prism having a height direction extending along the Y axis.

A head unit 4 is disposed in a space between the side frames 32 and 34 and the lateral frames 38A, 38B, and 38C. The head unit 4 includes the line head 40, a holding member 48, and a pair of support frames 52.

The line head 40 is a member elongated in the direction along the Y axis. As described above, the line head 40 faces the first conveyance route T1 not illustrated. The line head 40 incorporates a second control board 43 that controls the operation of the line head 40.

Both end portions of the line head 40 in the directions along the Y axis are attached to the respective support frames 52. The pair of support frames 52 face each of the in the direction along the Y axis on the inner sides of the side frames 32 and 34, and clamp the line head 40 therebetween.

The holding member 48 extends between the pair of support frames 52 in the direction along the Y axis. The holding member 48 is a member elongated in the direction along the Y axis. The holding member 48 serves as a structural member of the head unit 4 along with the pair of support frames 52.

The head unit 4 can move in the direction along the B axis, by being driven by a head unit driving unit 58. Specifically, the line head 40 moves back and forth in the directions along the B axis, while being clamped between the pair of support frames 52. The holding member 48 also moves in the directions along the B axis, to follow the movement of the line head 40. The position of the head unit 4 that has moved farthest in the −B direction is the recording position. The position of the head unit 4 that has moved farthest in the +B direction is the retracted position.

With respect to the side frame 32, the line head 40 is provided in the +Y direction, which is one side, and the first control board 26 not illustrated is provided in the −Y direction, which is the other side. Thus, the side frame 32 is provided between the line head 40 and the first control board 26. The line head 40 and the first control board 26 are electrically coupled through the cable 45.

The line head 40 includes a coupling portion 47. The coupling portion 47 is provided near the end portion of the line head 40 in the −Y direction. The cable 45 is coupled to the coupling portion 47, and the line head 40 and the cable 45 are electrically coupled at the coupling portion 47. Specifically, the cable 45 is electrically coupled to the second control board 43 incorporated in the line head 40. Thus, the cable 45 electrically couples the first control board 26 with the second control board 43. The cable 45 is a universal serial bus (USB) cable.

Since the cable 45 is a USB cable, the cable 45 has a smaller width than that of a flexible flat cable (FFC) used for the cable 45. Thus, contact between the edge of the hole 60 and the cable 45 can be suppressed. Furthermore, the hole 60 can have a smaller size.

The line head 40 is not limited to the configuration including the second control board 43. The line head 40 may not include the second control board 43, and a driving unit that is not illustrated for the line head 40 and the coupling portion 47 may be electrically coupled through an FFC.

The cable 45 is routed, from the coupling portion 47, in the +Y direction, and is curved in a substantially +B direction near the side frame 34. Then, the cable 45 is disposed toward the −Y direction along a plane facing a substantially +A direction of the holding member 48, and is routed into the hole 60 of the side frame 32. In other words, the cable 45 is routed, from the coupling portion 47, in a direction away from the side frame 32, is curved to approach the side frame 32, passes through the hole 60, and is routed toward the −Y direction of the side frame 32.

First regulating portions 63 and a restriction portion 65 are disposed on a surface of the holding member 48 facing the substantially +A direction. Thus, the first regulating portions 63 and the restriction portion 65 are fixed to the holding member 48 in the +Y direction of the side frame 32.

The first regulating portions 63 hold the cable 45 in the +Y direction of the side frame 32 and regulate the movement of the cable 45. The first regulating portions 63 are disposed on the above-described surface of the holding member 48, while being shifted in the +Y direction from the center. In other words, the first regulating portions 63 correspond to a position that is slightly returned in the −Y direction from the region where the cable 45 is curved in the vicinity of the side frame 34. The cable 45 is routed into the hole 60 through the first regulating portions 63 from the coupling portion 47.

Two first regulating portions 63 are provided along the Y axis. The first regulating portions 63 sandwich and hold the outer circumference of the cable 45 orthogonal to the length direction. The first regulating portions 63 regulate the movement of the cable 45 in directions other than the direction along the Y axis. The form, the number, and the arrangement of the first regulating portions 63 are not limited to the above.

The restriction portion 65 restricts movement of the cable 45. The restriction portion 65 is provided at the center in the above-described surface of the holding member 48, between the first regulating portions 63 and the hole 60, in the direction along the Y axis. The restriction portion 65 is provided to cover the cable 45 from a direction including the direction along the A axis, which is orthogonal to the +B direction.

Specifically, in side view of the holding member 48, the cable 45, and the restriction portion 65 in the direction along the Y axis, the restriction portion 65 is provided in a bridge form around the space in the +A direction of the cable 45 disposed along the holding member 48. Thus, the restriction portion 65 restricts the movement of the cable 45, when the cable 45 makes a relatively large movement in a direction including a +A direction component. In the state illustrated in FIG. 2, the cable 45 and the restriction portion 65 are not in contact with each other. The restriction portion 65 is disposed in a bridge form at three points at the center of the above-described surface of the holding member 48. The form, the number, and the arrangement of the restriction portion 65 are not limited to the above.

As described above, the cable 45 moves in conjunction with the movement of the head unit 4 in the +Y direction of the side frame 32. The cable 45, the movement of which is regulated or restricted by the first regulating portions 63 and the restriction portion 65, makes a change in the degree of curving and slight movement in accordance with the position of the head unit 4.

Figure 3:
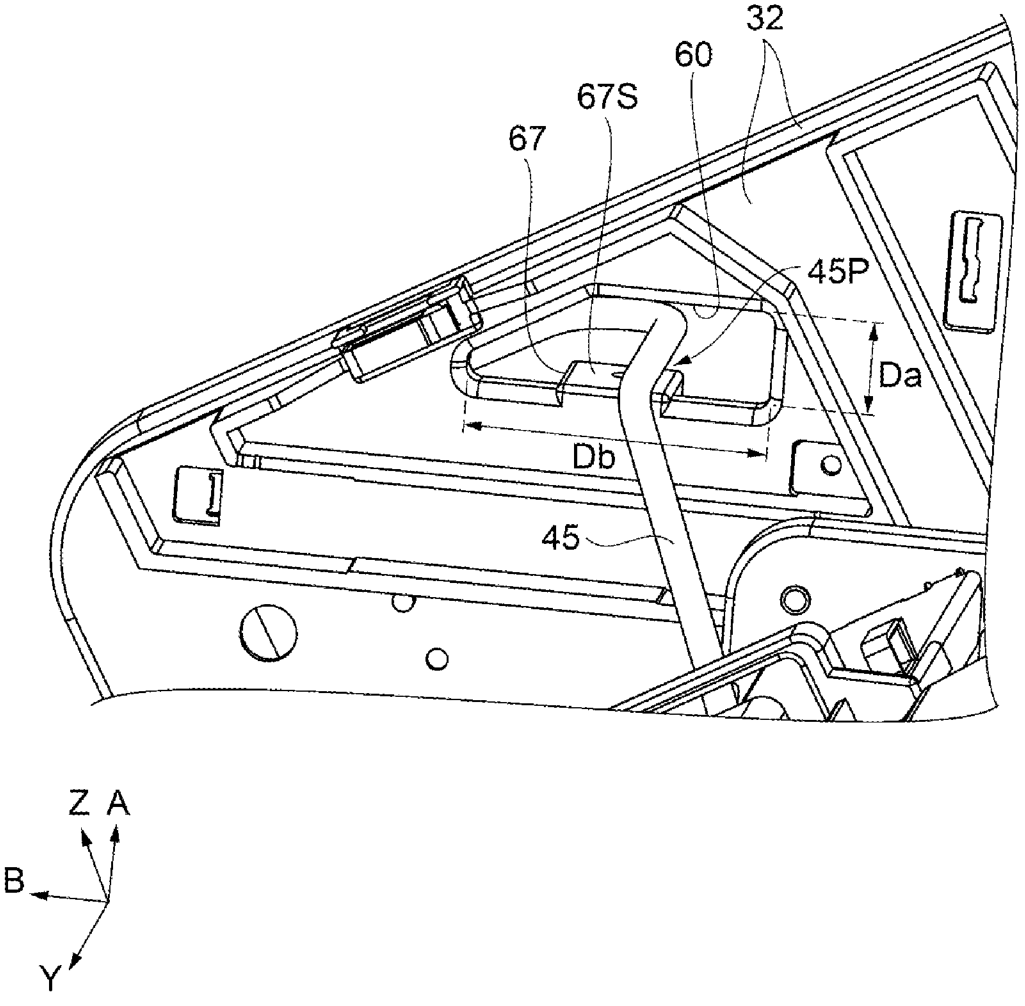
FIG. 3 is a schematic view illustrating a form of a hole and an arrangement of a support portion.

As illustrated in FIG. 3, the hole 60 has a rectangular shape elongated in the direction along the B axis. Specifically, the hole 60 has a diameter Db in the +B direction, which is the first direction, being longer than a diameter Da in the +A direction that is a second direction orthogonal to the first direction.

Regarding the movement of the head unit 4 in the direction along the B axis not illustrated, the diameter Db corresponds to the movement of the cable 45 in the direction along the B axis. The diameter Da is smaller than the diameter Db, and the movement of the cable 45 in the direction including the +A direction component due to the above-described movement of the head unit 4 is restricted by the restriction portion 65 described above. With these configurations, the edge of the hole 60 and the cable 45 are less likely to come into contact with each other.

The edge of the hole 60 in the −Z direction, which is the vertical direction, is provided with a support portion 67. The support portion 67 is provided to slightly protrude in the +Z direction from the edge of the hole 60 in the −Z direction. The support portion 67 is disposed at the center of the edge of the hole 60 in the −Z direction, in the direction along the B axis. The support portion 67 has a surface 67S along the +B direction as well as facing the +A direction.

The surface 67S has a substantially rectangular shape as viewed in the +A direction. The length of the surface 67S in the direction along the Y axis is longer than the length of the edge of the hole 60 in the direction along the Y axis. The length of the surface 67S in the direction along the B axis corresponds to approximately ⅓ of the diameter Db.

The surface 67S of the support portion 67 supports the −Z direction side of a passing portion 45P that is a portion of the cable 45 passing through the hole 60. The passing portion 45P is a region overlapping the edge of the hole 60 as viewed in the +A direction. The support portion 67 is provided at the edge of the hole 60 in the vertical direction with which the cable 45 is likely to come into contact due to the movement of the head unit 4. The surface 67S of the support portion 67 supports the cable 45. Thus, even when the cable 45 comes into contact with the support portion 67, damage on the cable 45 is suppressed because the contact area of the cable 45 is enlarged.

Figure 4:
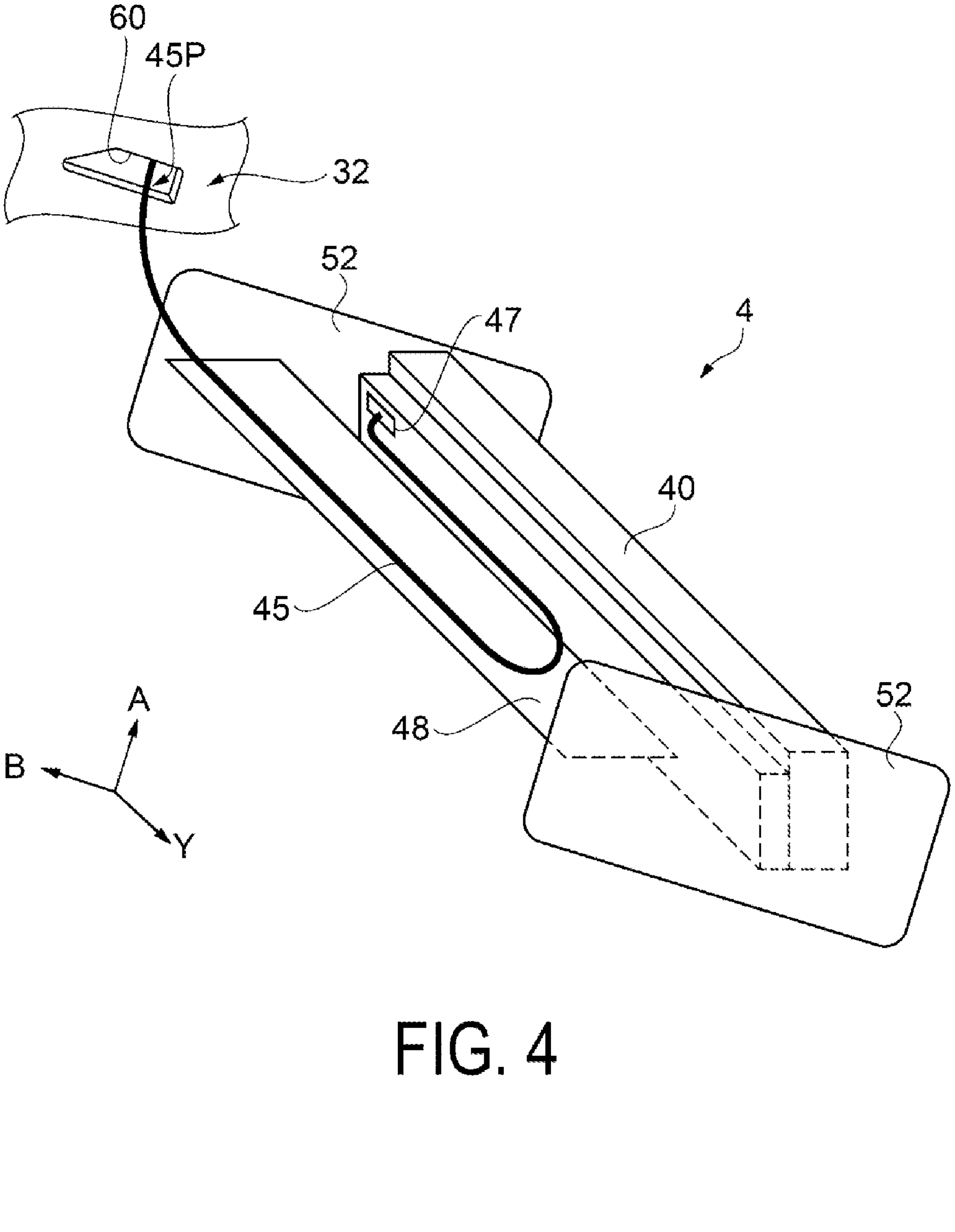
FIG. 4 is a schematic view illustrating a position of a passing portion of a cable when a line head is at a recording position.
Figure 5:
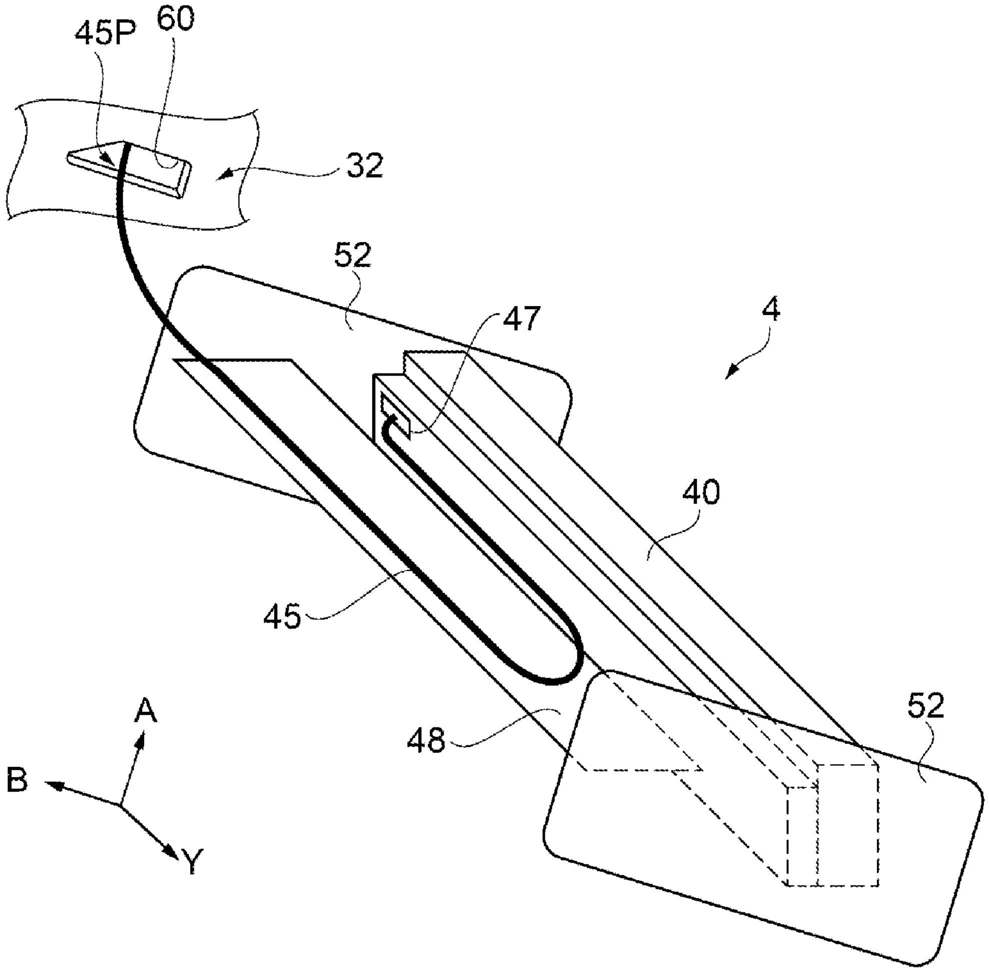
FIG. 5 is a schematic view illustrating a position of the passing portion of the cable when the line head is at a retracted position.

In FIG. 4 and FIG. 5 referred to in the description below, illustration of part of the configurations such as the first regulating portions 63 and the restriction portion 65 is omitted.

As illustrated in FIG. 4, when the line head 40 is at the recording position, the head unit 4 has moved farthest in the −B direction. In this state, the passing portion 45P of the cable 45 is positioned close to the edge of the hole 60 in the −B direction in accordance with the movement of the head unit 4. The cable 45 and the edge of the hole 60 in the −B direction do not come into contact with each other.

In contrast, as illustrated in FIG. 5, when the line head 40 is at the retracted position, the head unit 4 has moved farthest in the +B direction. In this state, the passing portion 45P of the cable 45 is positioned close to the edge of the hole 60 in the +B direction in accordance with the movement of the head unit 4. The cable 45 and the edge of the hole 60 in the +B direction do not come into contact with each other.

The diameter Db of the hole 60 in the +B direction is longer than a distance between the position of the passing portion 45P corresponding to the recording position and the position of the passing portion 45P corresponding to the retracted position.

Figure 6:
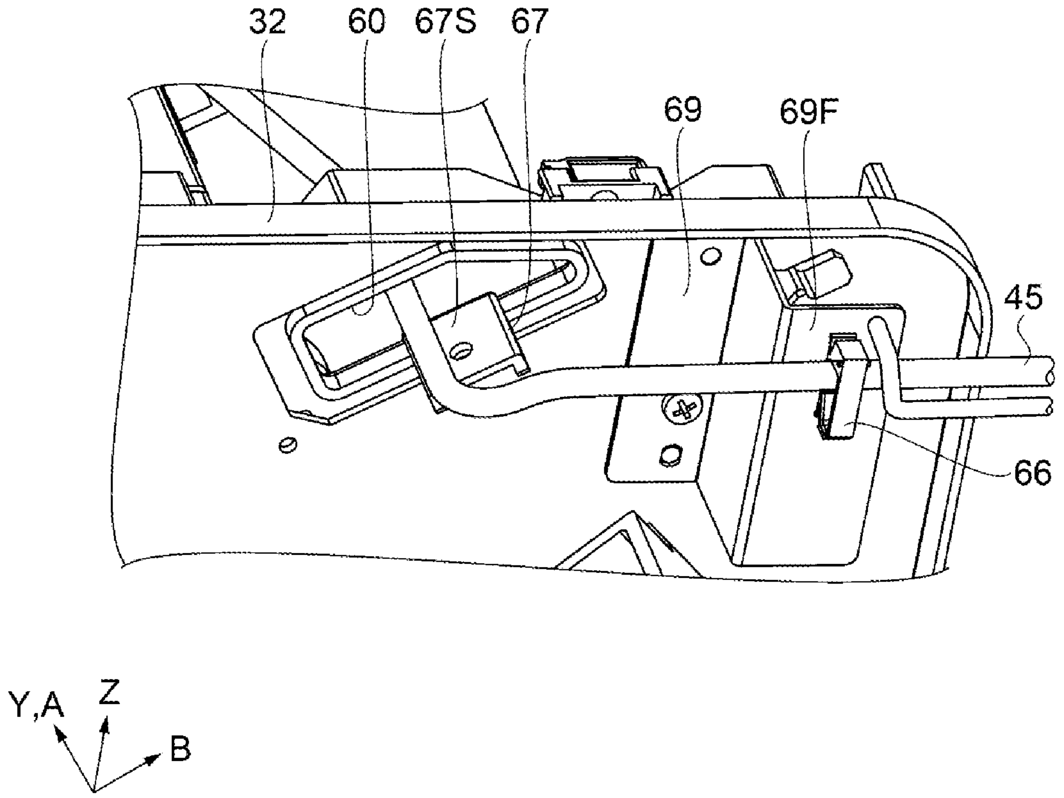
FIG. 6 is a schematic view illustrating an arrangement of a second regulating portion and the like in the side frame.

As illustrated in FIG. 6, a second regulating portion 66 and an attachment portion 69 are provided in the −Y direction, which is on the other side of the side frame 32. The attachment portion 69 is disposed on the right side of the hole 60 in FIG. 6.

The attachment portion 69 is a member obtaining by processing a substantially rectangular metal plate to provide a plurality of bent parts. The attachment portion 69 includes a portion 69F that is provided to come into contact with the surface of the side frame 32 in the −Y direction, and to be separated from the side frame 32. The surface of the portion 69F facing the −Y direction extends along the AB plane.

The second regulating portion 66 is provided on the above-described surface of the portion 69F of the attachment portion 69. The second regulating portion 66 sandwiches and fixes the outer circumference of the cable 45 orthogonal to the length direction. The second regulating portion 66 restricts the movement of the cable 45 in directions other than a substantially lateral direction in FIG. 6. The form, the number, and the arrangement of the attachment portion 69 and the second regulating portion 66 are not limited to the above.

The cable 45 is routed, from the +Y direction relative to the side frame 32, in the −Y direction through the hole 60. The cable 45 extends rightward in FIG. 6 from the hole 60, and is coupled to the first control board 26 not illustrated through the second regulating portion 66.

According to the present embodiments, the following advantages can be obtained.

In the recording device 1, the cost is reduced and damage on the cable 45 coupling the line head 40 to the first control board 26 can be suppressed. Specifically, the line head 40 and the first control board 26 are electrically coupled through the cable 45 passing through the hole 60 provided to the side frame 32. Therefore, a connector for relaying the cable 45 is omitted, whereby reduction of parts cost and the like can be achieved.

A range of movement of the passing portion 45P due to the movement of the line head 40 is less likely to result in interference with the edge of the hole 60. Thus, the contact between the cable 45 and the edge of the hole 60 is less likely to occur, whereby damage on the cable 45 is suppressed. With these configurations, the recording device 1 can be provided in which the cost is reduced and damage on the cable 45 coupling the line head 40 to the first control board 26 can be suppressed.

The cable 45 moves together with the line head 40, while being fixed by the holding member 48 together with the first regulating portions 63. Thus, even when the line head 40 moves, a range of movement of the cable 45 in the +Y direction, in which the line head 40 is disposed relative to the hole 60, is small. Thus, damage on the cable 45 is further suppressed, with the cable 45 being less likely to come into contact with another member.

The restriction portion 65 restricts the movement of the cable 45 in the +A direction, when the line head 40 moves. The diameter Da of the hole 60 in the +A direction is smaller than the diameter Db in the +B direction, but the restriction portion 65 makes the cable 45 less likely to come into contact with the edge of the hole 60. Thus, damage on the cable 45 in the +Y direction is further suppressed. Additionally, since the diameter Da of the hole 60 in the +A direction is smaller than the diameter Db in the +B direction, the hole 60 would not be so large, whereby the strength of the side frame 32 can be guaranteed.

The cable 45 routed in the −Y direction through the hole 60 is fixed to the second regulating portion 66 separated from the side frame 32, via the attachment portion 69. Thus, the curve of the cable 45 can be made mild, compared with the second regulating portion 66 being directly provided to the side frame 32. The cable 45 is routed away from the side frame 32 in the −Y direction, whereby the contact between the cable 45 and the side frame 32 and the like can be further suppressed. With these configurations, damage on the cable 45 in the −Y direction of the side frame 32 can be suppressed.

The cable 45 is directed from the coupling portion 47 toward the hole 60 through the first regulating portions 63. Thus, even when the degree of curving of the cable 45 changes due to the movement of the line head 40, the first regulating portions 63 restrict the movement of the cable 45. With this configuration, the edge of the hole 60 and the cable 45 are even less likely to interfere with each other.

With the coupling portion 47 serving as the starting point, the cable 45 is routed for a relatively long distance to be away from the side frame 32 and curved to approach the side frame 32. Thus, the movement of the cable 45 due to the movement of the line head 40 is likely to be absorbed in the curved region. With this configuration, the distance of movement of the position of the passing portion 45P caused by the movement of the line head 40 is small, whereby the contact between the edge of the hole 60 and the cable 45 can be more effectively suppressed.

What is claimed is:

1. A recording device comprising:

a recording unit configured to:

move to a recording position to perform recording on a medium; and move from the recording position to a retracted position in a first direction;

a first control board coupled to the recording unit;

a cable configured to electrically couple the recording unit to the first control board;

a frame provided between the recording unit and the first control board; and a hole that is provided in the frame and through which the cable passes, wherein a diameter of the hole in the first direction is longer than a distance between a first position of a passing portion corresponding to the recording position and a second position of the passing portion corresponding to the retracted position, the passing portion being a portion of the cable passing through the hole, and the passing portion moves from the first position to the second position in the first direction based on the movement of the recording unit from the recording position to the retracted position in the first direction.

2. The recording device according to claim 1, further comprising:

a first regulating portion configured to regulate movement of the cable; and a holding member configured to move in conjunction with the movement of the recording unit, wherein the recording unit is provided on one side of the frame and the first control board is provided on another side of the frame, and the first regulating portion is fixed to the holding member on the one side.

3. A recording device comprising:

a recording unit configured to move to a recording position to perform recording on a medium and to a retracted position where the recording unit is retracted in a first direction from the recording position, wherein the first direction is a direction intersecting with the medium being recorded;

a first control board coupled to the recording unit;

a cable configured to electrically couple the recording unit to the first control board;

a frame provided between the recording unit and the first control board;

a hole that is provided in the frame and through which the cable passes;

a first regulating portion configured to regulate movement of the cable; and a holding member configured to move in conjunction with the movement of the recording unit, wherein the recording unit is provided on one side of the frame, the first control board is provided on another side of the frame, the first regulating portion is fixed to the holding member on the one side, the first regulating portion is on a surface of the holding member that faces a second direction, and the second direction is orthogonal to the first direction.

4. The recording device according to claim 2, further comprising a restriction portion that is provided between the first regulating portion and the hole, and is configured to restrict the movement of the cable, wherein the diameter of the hole in the first direction is larger than a diameter of the hole in a second direction orthogonal to the first direction, and the restriction portion is fixed to the holding member while covering the cable from a direction including a component of the second direction.

5. The recording device according to claim 2, further comprising:

a second regulating portion that is provided on the other side of the frame and is configured to fix the cable; and an attachment portion that is provided on the other side of the frame and includes a portion separated from the frame, wherein the second regulating portion is provided at the portion of the attachment portion separated from the frame.

6. The recording device according to claim 2, further comprising a coupling portion where the recording unit and the cable are coupled, wherein the cable is routed from the coupling portion into the hole through the first regulating portion.

7. The recording device according to claim 1, further comprising a coupling portion where the recording unit and the cable are coupled, wherein the cable is routed from the coupling portion in a direction away from the frame, is curved to approach the frame, and passes through the hole.

8. The recording device according to claim 1, further comprising a support portion in a vertical direction of the hole, the support portion having a surface along the first direction, wherein the surface of the support portion supports the passing portion on a vertical direction side of the passing portion.

9. The recording device according to claim 1, wherein the recording unit includes a second control board configured to control an operation of the recording unit, and the cable is a USB cable coupling the first control board to the second control board.

10. The recording device according to claim 1, wherein the first direction is a direction crossing a vertical direction and a horizontal direction.

11. The recording device according to claim 1, wherein a first edge of the hole is opposite to a second edge of the hole in the first direction, the passing portion is not in contact with the first edge of the hole in a case where the recording unit is at the recording position, and the passing portion is not in contact with the second edge of the hole in a case where the recording unit is at the retracted position.

12. The recording device according to claim 1, wherein the first direction is a direction intersecting with the medium being recorded.

13. The recording device according to claim 3, wherein the cable is along the surface of the holding member that faces the second direction.

14. The recording device according to claim 4, wherein the restriction portion covers the cable along a direction crossing the first direction and the second direction.

15. The recording device according to claim 5, wherein the attachment portion includes the portion separated from the frame in a direction crossing the first direction and a second direction, and the second direction is orthogonal to the first direction.

16. A recording device comprising:

a recording unit configured to move to a recording position to perform recording on a medium and to a retracted position where the recording unit is retracted in a first direction from the recording position;

a first control board coupled to the recording unit, wherein the recording unit includes a second control board configured to control an operation of the recording unit;

a universal serial bus (USB) cable configured to electrically couple the second control board to the first control board;

a frame provided between the recording unit and the first control board; and a hole that is provided in the frame and through which the USB cable passes, wherein a diameter of the hole in the first direction is longer than a distance between a position of a passing portion corresponding to the recording position and a position of the passing portion corresponding to the retracted position, the passing portion being a portion of the USB cable passing through the hole.

* * * * *